Feb. 2, 1960          A. M. LEITZEL          2,923,352
APPARATUS FOR MOLDING PULP ARTICLES HAVING
APERTURES FORMED THEREON
Filed Jan. 31, 1955
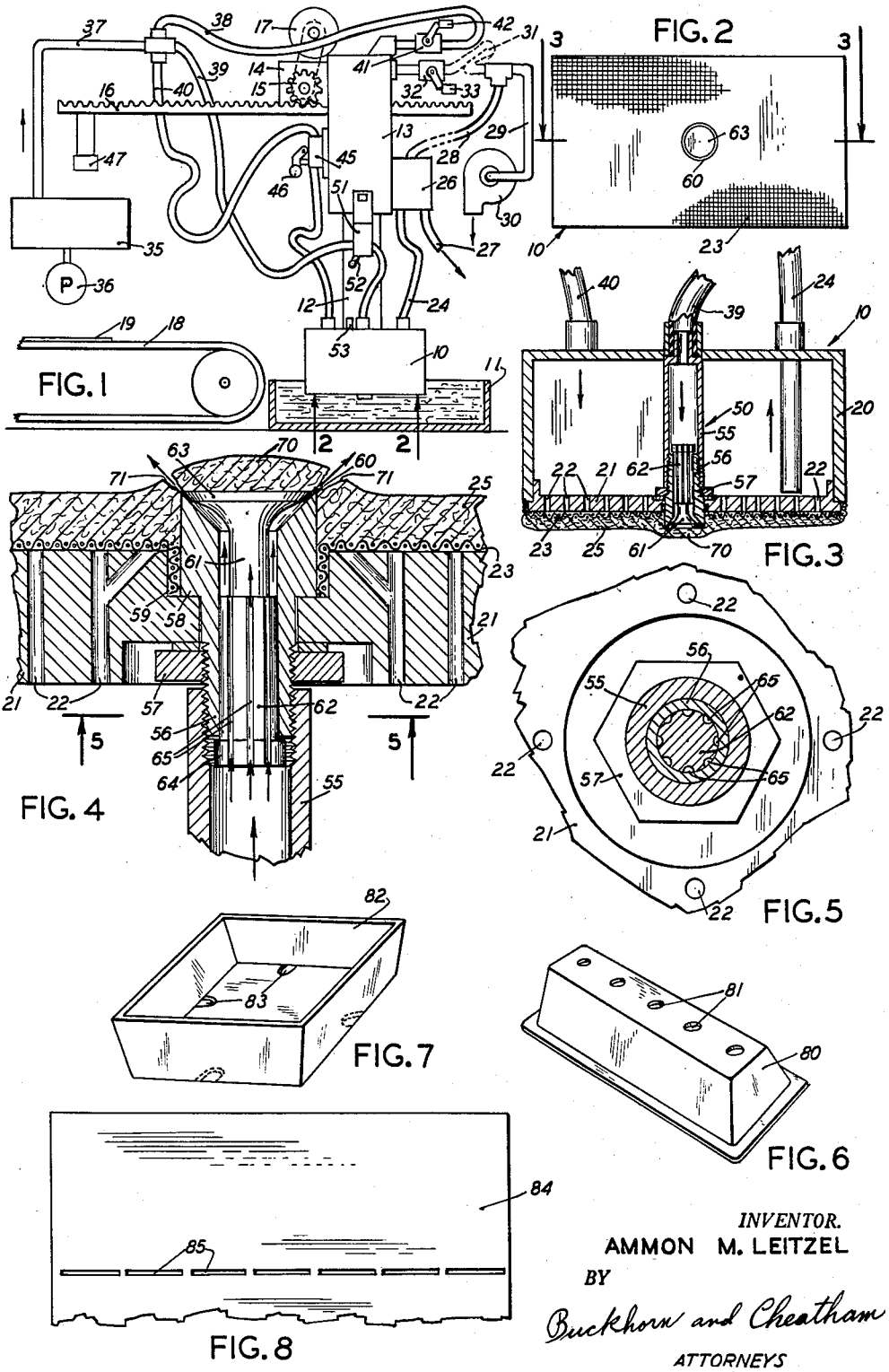
INVENTOR.
AMMON M. LEITZEL
BY
Buckhorn and Cheatham
ATTORNEYS United States Patent Office 2,923,352
Patented Feb. 2, 1960

2,923,352
APPARATUS FOR MOLDING PULP ARTICLES HAVING APERTURES FORMED THEREON

Ammon M. Leitzel, Portland, Oreg., assignor, by mesne assignments, to Diamond National Corporation, a corporation of Delaware Application January 31, 1955, Serial No. 484,879

7 Claims. (Cl. 162—383)

The present invention comprises a method and apparatus for molding pulp articles having apertures in a wall thereof, such as flower pots having a drain opening in the bottom, ventilated berry hallocks, planter boxes having drain openings therein, articles having aligned perforations along which the article may be torn apart or folded, and numerous others.

Such articles have been formed in the past by a variety of methods. For example, the article, after it has been formed and dried, may have the aperture punched, cut or otherwise formed therein, which is obviously a costly step requiring punching or cutting equipment and expensive handling. Another method has been to provide a stud or other obstruction projecting beyond the surface of the suction mold upon which the article is formed to a greater extent than the thickness of the layer of pulp formed on the suction mold. While this may result in the formation of the article with the desired apertures therein, it has not proven satisfactory because the article must be separated from the mold and the friction of the stud or projection against the moist fibers surrounding the same often tears or otherwise destroys the wet, formed article. Furthermore, the friction often prevents blowing of the wet, formed article from the surface of the mold unless such excessive pressures are used that the article is blown apart. It is usually necessary to employ a laborer at the ejection station of the molding equipment carefully to remove the wet, formed article from the mold. A partial solution to the foregoing has been to provide a stud or projection in the shape of the desired aperture and which projects beyond the surface of the mold to an extent less than the thickness of the deposited layer of wet pulp. While this permits automatic ejection of the wet, formed article, the result is unsatisfactory since the outer surface of the stud or projection is usually bridged over by a plug of pulp which must be removed in a subsequent handling operation. In the type of molding apparatus in which the wet, formed article is subjected to pressure between matching molds and heated while being compressed in order to form a dense article having a smooth surface on both sides, the plug of material which forms over the head of the stud or projection usually cannot be removed until after the article is ejected from between the matching molds, and this plug has become so dense and firmly united to the remainder of the article that it must be punched or otherwise removed from the article by the use of machinery and extra handling. The present invention comprises means whereby apertures of the desired outline are automatically formed immediately upon removal of the suction mold from the slurry of pulp, whereby the wet formed article may be "ironed," or ejected into drying equipment without any handling.

An object of the present invention is to provide means of the foregoing character which may be provided in any desired shape and size.

A further object of the present invention is to provide means and a method for forming molded pulp articles having apertures therein wherein the edges of the apertures are clean-cut and the article is thus commercially acceptable.

The foregoing and other objects and advantages of the present invention will be more readily apparent from inspection of the accompanying drawings, taken in connection with the following specification, wherein a preferred form of equipment and the method and articles formed thereby are illustrated and described.

Referring to the drawings,

Fig. 1 is a schematic representation of one type of automatic article molding equipment in which the present invention is employed;

Fig. 2 is a view looking upward from the plane indicated at 2—2 in Fig. 1 and showing the surface of the suction mold;

Fig. 3 is a vertical section, taken substantially along line 3—3 of Fig. 2;

Fig. 4 is a vertical section, on an enlarged scale, of an embodiment of the apparatus of the present invention and illustrating the method;

Fig. 5 is a horizontal section, taken substantially along line 5—5 of Fig. 4; and Figs. 6, 7 and 8 illustrate typical molded pulp articles formed in accordance with the present invention.

It is to be appreciated that the equipment illustrated in Fig. 1 is highly schematic, only sufficient details being given to make the apparatus and method clear. The machine is intended to be representative of all suction molding equipment for forming molded pulp articles. It will be recognized by those skilled in the art that many other machines now in existence and yet to be developed may have the suction mold of the present invention incorporated therein.

The machine of Fig. 1 comprises a suction mold 10 which is adapted to be immersed in a slurry of pulp fibers in a tank 11 while suction is being applied in order to form a layer pulp in the shape of the desired article on the surface of the suction mold. The suction mold 10 is mounted on the end of a piston 12 which cooperates with a cylinder 13 whereby the mold is immersed in the slurry and elevated above the tank in proper sequence. The cylinder 13 is reciprocated laterally by any suitable means, as exemplified by the carriage 14 upon which the cylinder is mounted and which is reciprocated laterally by a pinion 15 cooperating with a fixed rack 16. The pinion is rotated in either direction by suitable means such as the electric motor 17 connected thereto by a belt and pulleys and controlled automatically by suitable switches (not shown) whereby the carriage is moved to the position illustrated, arrested in that position while the suction mold is immersed in the slurry and then elevated after a suitable length of time, then moved to a position above an ejection conveyor 18 and arrested while the formed article indicated at 19 is blown off the mold onto the conveyor.

It will be recognized by those skilled in the art that the suction mold herein illustrated is a very schematic representation, the mold being intended merely as exemplary of all suction molds and all of which can be modified to incorporate the present invention. The mold is illustrated as comprising a hollow head 20 having its open, lower end bridged by a plate 21 through which are drilled a plurality of passages 22. A wire screen 23 of fine mesh capable of straining the pulp fibers from the liquid of the slurry is stretched across the outer surface of the plate 21. A suction tube 24 extending into the hollow head creates a vacuum in the hollow head whereby suction through the passages 22 and the screen 23 causes the deposit of a layer 25 of interlaced pulp fibers on the surface of the screen in the shape of the desired article 19, in this case a flat, rectangular pad. The suction tube 24 extends to the bottom of the head 20 whereby liquid drawn through the passages 22 will be entrained into the suction tube 24. The tube 24 conducts the liquid into a separator 26 from which the liquid is ejected through a waste tube 27. It will be recognized by those skilled in the art that many systems exist for applying suction to a suction mold and ejecting the liquid. Suction is applied continuously through a branch 28 of a main suction pipe 29 leading from a vacuum pump 30. A second extensible branch 31 leads to the cylinder 13 through a valve 32 of the type which normally remains open but which is closed when an operating lever on the valve engages an abutment 33 as the carriage 14 reaches the limit of its movement toward the tank 11.

A gas under pressure, for example air, is supplied to the equipment from a pressure tank 35 into which it is forced by a pump 36. The pressure tank 35 is connected to the equipment through a main line 37 and three extensible branches 38, 39 and 40. The branch 38 is connected to the cylinder 13 through a valve 41 also having a valve lever adapted to engage an abutment 42 at the same time that the abutment 33 is engaged. Valve 41 is normally closed but is opened in the desired sequence. Suction is applied to hold the head 10 elevated during its travel from and back to the slurry tank. The abutments 33 and 42 are simultaneously engaged to turn off the suction and apply pressure to project the suction head into the tank. When the carriage 14 starts moving toward the conveyor 18 the valve 41 is immediately closed and valve 32 immediately opened whereby the suction head is retracted from the tank and held in retracted position until the carriage again returns to a position above the tank.

The branch pressure air conduit 40 is connected to the suction mold through a normally closed valve 45 which is adapted to be opened by an actuator 46 engaging a fixed abutment 47 at the opposite end of travel of the carriage 14 when the suction head 10 is positioned above the conveyor 18. A blast of compressed air is thus introduced into the suction mold to overcome the relatively weak suction therein momentarily and thereby blow the formed article off the mold onto the conveyor. It will be recognized by those skilled in the art that this action may occur after the formed article has been ironed between the suction mold and a matching heated ironing mold (not shown) which is moved into and out of engagement therewith in properly timed relation.

The third pressure conduit branch 39 leads to a closed passage through the suction mold indicated generally by the numeral 50, through a valve 51 which is normally closed. The valve 51 is mounted on the lower end of the cylinder 13 and is adapted to be opened by an actuator 52 which projects downwardly toward the suction mold and is adapted to engage an abutment 53 on the suction head. It will be recognized that the engagement of the actuator 52 with the abutment 53 occurs when the suction mold is retracted from the tank of slurry and has been moved to a position laterally thereof toward the conveyor 18, for a purpose to be described.

The closed passage 50 comprises a fitting 55 which extends through the mold and is screwed onto the inner end of a valve body 56 projecting through the perforated plate 21, and which is held in position thereon by a nut 57 which clamps a shoulder 58 on the valve body against the bottom of a socket 59 in the outer surface of the plate 21. The valve body 56 thereby constitutes the extreme end of the conduit 50. The outer end of the valve body is provided with a sharp edge 60 in the outline of the desired aperture, which sharp edge lies parallel to the plane of the screen 23 and is projected beyond the surface of the suction mold a distance about equal to the thickness of the layer 25 of fibers formed thereon, for example about three-sixteenths of an inch. The screen 23 is slit at this point and its edges turned downwardly into the socket 59 whereby the screen is clamped against the surface of the plate 21 in the region of the valve. A valve 61 comprising an elongated stem 62 and a head 63 (referring particularly to Fig. 4) is slidably mounted in the valve body 56. The outer surface of the head 63 lies substantially in the plane of the edge 60 and is preferably parallel to the screen 23. The stem 62 projects through the valve body and a flange 64 on the inner end thereof is adapted to engage the inner end of the valve body 56 to limit movement of the valve to a few thousandths of an inch. However, the length of the valve with respect to the valve body is such that the valve head 63 may be raised from its seat against the outer end of the valve body a slight amount when outward pressure is exerted by the compressed air entering the conduit. A plurality of passages 65 extend longitudinally of the valve stem to permit the passage of air under compression through the valve and ejection thereof outwardly beneath the valve head 63 in a thin stream along the outline of the desired aperture. It is apparent that the thin stream of gas extends around the valve head 63 to form a hollow stream of gas having thin marginal portions directed along the outline of the desired aperture.

When the layer of pulp is being deposited on the suction mold interlaced fibers will form above the head 63 of the valve to form a plug 70 above the head of the valve, connected to the main layer 25 through connecting portions adjacent the edge 60 of the valve body. These connecting portions are relatively thinner than the main layer 25 of deposited pulp, due to the previously mentioned projection of the outer end of the valve body 56 beyond the plane of the screen 23 by a distance about equal to the thickness of the layer 25 of fibers deposited on the screen 23. The inner surface of the valve body is countersunk to provide a conical seat for the valve head 63 and the air which is emitted is directed angularly outward, at an angle depending upon the angle of inclination of the seat and the adjacent portions of the inner surface of the valve body. This angle may be varied, but an angle approaching forty-five degrees is satisfactory and will not permit the valve to wedge itself into the valve seat. The bridging portions of the fiber mat at the edge 60 are thus cut at an angle to the surface by the blast of air pulling the fibers apart, as indicated at 71. Due to the relative thinness of these bridging portions of the fiber mat, they are cut more easily and a less ragged cut results, than if the blast of air were applied through the entire thickness of the main layer 25 of the deposited pulp mat. The plug 70 is blown away from the mold, leaving slightly jagged edges on the outer edge of a substantially clean-cut opening of the desired outline extending through the layer of fibers, as indicated at 71. This action occurs after the mold has traveled laterally from above the tank 11 so that the plug is not blown back into the slurry. If the article is to be rough finished, in other words ejected onto a conveyor such as conveyor 18 and dried without pressing, this jagged edge is hardly noticeable due to the generally rough surfaces of such articles. If the article is to be ironed between matching molds, the ironing mold will have a depression corresponding to the outline of the projecting portion of the valve body and the jagged edge 71 will be compressed along with the remainder of the article so that an absolutely smooth aperture is thus formed.

It will be appreciated that the thin blast of compressed air or other gas is directed through the pulp article while the pulp article remains on the suction mold, and while suction is being maintained to hold the pulp article in position on the mold. Preferably, the valve actuator 52 and valve 51 are so arranged that the valve is opened momentarily and then continued upward movement of the abutment against the valve actuator closes the valve. Therefore, when the valve 45 is opened to blow the article from the mold the pressure has been cut off from the valve 56 so that the formed edge of the aperture will not be disrupted. When the empty mold is returned to the slurry tank the valve 51 will momentarily open prior to entry of the suction mold into the slurry, and the valve 51 is closed during the formation of the fiber article.

The air is directed outwardly through the fibers almost immediately after removal of the suction mold from the slurry, while the fibers are still wet and relatively free to slip and slide with respect to each other. Therefore, the tearing apart at 71 is minimized and a small gap created. Furthermore, due to the continued suction inside of the mold, the fibers which remain attached to the layer 25 tend to be drawn back so that the thickness of the article at the edge of the aperture is substantially the same as the average thickness throughout the layer 25.

Fig. 6 illustrates a planter box 80 having a plurality of drain apertures 81 formed therein by means of a plurality of valves, as previously described, mounted in the suction head upon which the planter box is formed, all such valves being connected to a common pressure conduit through a single, automatically actuated valve as previously described. Fig. 7 illustrates a berry hallock 82 formed in accordance with the present invention to have a plurality of ventilating openings 83 therein. Fig. 8 illustrates a pulp article such as a packing sheet 84 having a plurality of aligned slots 85 formed therein in accordance with the present invention to provide a line along which the article may be folded or torn apart. The valves for forming the various shapes of apertures thus illustrated will be appropriately shaped. It will be recognized that in all such articles as illustrated the apertures are formed in a flat article or in the bottom of an article having sloping side walls whereby projecting valve bodies, as illustrated in Fig. 4, may be employed and will not interfere with the action of blowing the finished article from the mold, nor interfere with the action of an ironing mold. However, the present invention contemplates the provision of valves having their edges flush with the surface of the mold whereby such apertures may be formed in side walls. In such cases, however, the compressed air would blast larger openings since the air is ejected through the entire thickness of the pulp layer, with the result that the edge of the opening would not be clean-cut and might be thin. However, it is within the contemplation of the present invention that such construction comes within the scope of the invention, since articles may be desired wherein the drawbacks noted are not important.

Having illustrated and described a preferred embodiment of the present invention, it should be apparent to those skilled in the art that the invention permits of modification in arrangement and detail. I claim as my invention all such modifications as come within the true spirit and scope of the appended claims.

I claim:

1. Means for forming a molded pulp article having an aperture therethrough comprising a suction mold in the shape of the desired article, means for immersing said mold in a slurry of pulp fibers, means for applying suction to the mold while it is immersed in said slurry of pulp fibers to cause the deposit of a layer of pulp fibers on the surface of the mold, a conduit extending through said mold to the surface thereof upon which the layer of pulp fibers is deposited, the outer end of said conduit having an inner edge in the outline of the desired aperture, a valve mounted in said conduit and comprising a guide stem extending into said conduit and a head normally seated in the end of the conduit, means for directing a gas under pressure through said conduit when the suction mold is removed from the slurry of fibers and while the layer of pulp fibers remains thereon, and means in said valve to limit raising of said head from its seat to a slight amount whereby gas is emitted from said valve in a thin stream along the edge of said head through the layer of pulp while it is still moist and the fibers are free to slip with respect to each other.

2. The construction set forth in claim 1, wherein said outer end of said conduit comprising a sharp edge projecting a slight amount beyond the surface of the suction mold and the outer surface of the head of the valve lies in the plane of the edge of the conduit when the valve is closed.

3. The construction set forth in claim 1 wherein said means for applying suction to the mold remains active while gas is being emitted through said valve.

4. Apparatus for molding pulp articles having apertures formed therein, comprising a suction mold having a forming surface shaped to produce the desired articles by suction deposition of a layer of pulp fibers thereon, means for applying suction to the mold while it is immersed in a slurry of pulp fibers to cause said fibers to deposit on said forming surface, a tubular conduit extending through the mold including the forming face thereof and terminating in a peripheral edge having the outline of the aperture to be formed in pulp articles molded thereon, said peripheral edge of the conduit projecting beyond the forming face of the mold a distance approximately equal to the thickness of the layer of pulp fibers normally deposited on the forming face during the molding of a pulp article thereon, a valve mounted movably in said conduit including a valve head adapted to be seated within the peripheral edge of the conduit when the valve is closed and adapted to move outwardly above said edge when the valve is open, means for guiding the movement of the valve, means for limiting the movement of the valve between its open and closed positions, said valve head cooperating with the peripheral edge of the conduit to direct a hollow stream of gas outwardly through the layer of deposited pulp when the valve is open, and means for supplying gas under pressure to the conduit while suction is applied to the mold.

5. The apparatus defined by claim 4, wherein said guiding means is a valve stem projecting axially into the conduit from the valve head for guiding the movement of the valve, and said movement limiting means is a flange mounted on the valve stem in engagement with the walls of the conduit to limit the movement of the valve between its open and closed positions.

6. The apparatus defined by claim 5, wherein the valve stem conforms to the configuration of the conduit and is mounted in slidable engagement with the walls of the conduit, and said stem is provided with a plurality of longitudinal grooves at intervals about its periphery to provide passages for supplying the air under pressure to the valve.

7. In apparatus for molding pulp articles having apertures formed therein, comprising a suction mold having a forming surface shaped to produce the desired articles by suction deposition of a layer of pulp fibers thereon, means for applying suction to the mold while it is immersed in a slurry of pulp fibers to cause said fibers to deposit on said forming surface, a tubular conduit extending through the mold and terminating in a peripheral edge having the outline of the aperture to be formed in pulp articles molded thereon, a valve mounted in said conduit including a valve head cooperating with the peripheral edge of the conduit for directing a hollow stream of gas outwardly through the layer of deposited pulp, and means for supplying gas under pressure to the conduit while the suction is applied to the mold, the improvement comprising an extension of the conduit projecting through the forming face of the mold and having the peripheral edge of the conduit extending beyond the forming face of the mold a distance approximately equal to the thickness of the layer of pulp fibers normally deposited on the forming surface during the molding of a pulp article thereon.

References Cited in the file of this patent

UNITED STATES PATENTS

| Re. 13,730 | Weston | May 12, 1914 |
| 720,593 | Lindberg | Feb. 17, 1903 |
| 798,789 | Hendrickson | Sept. 5, 1905 |
| 1,699,760 | Sherman | Jan. 22, 1929 |
| 1,718,573 | Millspaugh | June 25, 1929 |
| 1,809,852 | Jay | June 16, 1931 |
| 2,032,923 | Eldridge | Mar. 3, 1936 |
| 2,302,020 | Frederick | Nov. 17, 1942 |